April 19, 1949.　　　　K. POSTHUMUS　　　　2,467,775
DEVICE FOR DETECTING PULSES MODULATED
BY A SIGNAL TO BE REPRODUCED
Filed Nov. 22, 1946
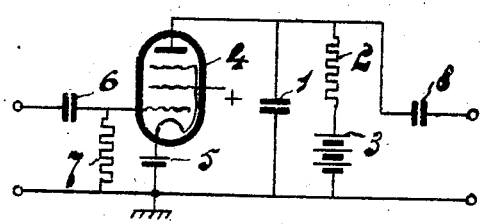
Fig.1.
Fig.2a.
Fig.2b.
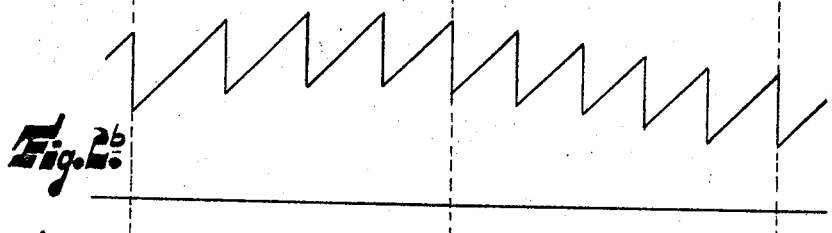
Fig.2c.
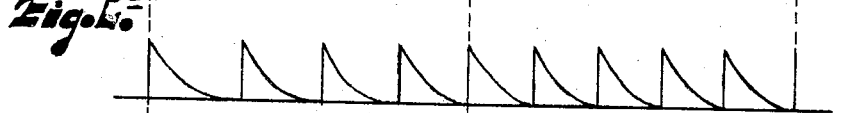
Fig.2d.
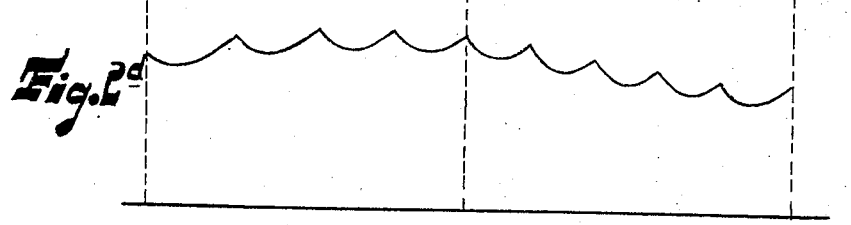
Fig.3.
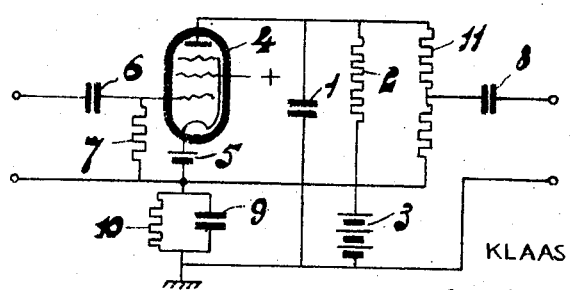
INVENTOR
KLAAS POSTHUMUS
BY
AGENT Patented Apr. 19, 1949

2,467,775

UNITED STATES PATENT OFFICE 2,467,775

DEVICE FOR DETECTING PULSES MODULATED BY A SIGNAL TO BE REPRODUCED

Klaas Posthumus, Eindhoven, Netherlands, assignor to Hartford National Bank and Trust Company, Hartford, Conn., as trustee Application November 22, 1946, Serial No. 711,690
In the Netherlands October 1, 1945

Section 1, Public Law 690, August 8, 1946
Patent expires October 1, 1965

6 Claims. (Cl. 250—27)

This invention relates to a device for converting pulses, which are short with respect to their relative distance and of which the relative distance varies in accordance with the instantaneous value of the amplitude of a signal to be reproduced, into amplitude variations corresponding with this signal, and more particularly to a device for converting pulses of which the phase is proportional to the instantaneous value of the amplitude of the signal to be reproduced.

According to the copending U. S. patent application Serial No. 711,676, filed November 22, 1946, of T. Douma the conversion is effected by converting the pulses into a sawtooth current or voltage, the time during which the current or voltage varies in a definite sense being dependent on the distance between the pulses, whereas the time during which the sawtooth current or voltage varies in an opposite sense, is constant, the variation of the current or voltage during this constant time being constantly the same. The desired amplitude variations can be derived from this current or voltage through a low-pass filter, of which the cut-off frequency is equal to or lower than the fundamental frequency of the pulses.

In cases where the pulse frequency approaches the highest modulation frequency, it is, however, difficult to construct a filter to be such that the fundamental frequency is not allowed to pass without materially attenuating the highest modulation frequencies.

The invention relates to an improvement of the device described in the aforesaid copending application, the object of the improvement being to eliminate the fundamental frequency without materially affecting the ratio between the modulation frequencies.

In the device according to the invention the pulses to be converted are supplied to a control-grid of a discharge tube, through which a condenser, which is charged and discharged respectively during the interval between two pulses, is discharged and charged respectively during the pulses.

According to the invention the purpose aimed at is arrived at by inserting an auxiliary condenser shunted by a resistance and preferably equal to the aforesaid condenser, in the discharge and charge circuit respectively of this condenser and by obtaining the detected output voltage from the difference between two voltages that are proportional to the condenser voltages and exhibit equal variations during the pulses.

The discharge time of the auxiliary condenser is preferably shorter than the charge and discharge time respectively of the first-mentioned condenser.

In one form of construction of the circuit-arrangement according to the invention the auxiliary condenser is connected on one hand, to the condenser electrode remote from the anode and the output voltage is taken between a point of a resistance, shunting the series-connection of the two condensers, and the junction of the two condensers.

In order that the invention may be clearly understood and readily carried into effect, it will now be described more fully with reference to the accompanying drawing.

Fig. 1 represents one form of construction of the circuit-arrangement of the kind to which the invention relates. This circuit-arrangement comprises a condenser 1, which is charged through a resistance 2 by a direct voltage supply 3 and can discharge through a discharge tube 4 which is preferably constructed as a screen-grid tube, more particularly as a pentode. To the grid of the tube 4 is supplied such a negative voltage originating from a voltage supply 5, that the tube 4 is normally blocked. The pulses to be converted, of which the relative distance varies in accordance with the instantaneous value of the amplitude of the signal to be reproduced, are supplied, through a condenser 6 and a resistance 7, to a grid of the tube 4 and this in such manner that the tube 4 is conductive for the duration of each pulse supplied. Thus the discharge time of the condenser is determined by the pulse duration, the charging time by the interval of the pulses. If the interval between the pulses supplied is constant, there is set up across the condenser a sawtooth voltage having the fundamental frequency of the pulses supplied and having a constant amplitude. If, however, the distance between the pulses varies with the instantaneous value of the amplitude of a signal to be reproduced, a sawtooth voltage, of which the maximum amplitude varies with the instantaneous value of the amplitude of the signal to be reproduced appears across the condenser. One of the leads through which the output voltage is obtained from the condenser 1, comprises a blocking condenser 8.

Fig. 2a illustrates the pulses to be detected which are supplied to the grid of tube 4. The pulses are characterized in that their average frequency (fundamental frequency) is constant, but the phase varies with the instantaneous value of the amplitude of a signal to be reproduced.

The voltage set up at the condenser 1 is illustrated in Fig. 2b where the maximum amplitude of the voltage appearing across the condenser is proportional to the phase of the pulses supplied and consequently to the instantaneous value of the amplitude of the signal to be reproduced. From this voltage the signal to be reproduced can be derived by supplying this voltage to a reproducing device through a low-pass filter which cuts off the fundamental frequency of the pulses.

Fig. 3 shows a form of construction of a circuit-arrangement according to the invention for detecting phase-modulated pulses, in which the fundamental frequency is eliminated without the use of a filter. In this circuit-arrangement the discharge circuit of condenser 1 includes an auxiliary condenser 9 which is preferably equal to the condenser 1. The condenser 9 is shunted by a resistance 10 and is connected at one end to an electrode of the condenser 1.

The condenser 9 is charged for the duration of pulse by the discharge current of condenser 1 and discharged through a resistance 10 during the interval between the pulses. If the time constant of the parallel connection of condenser 9 and resistance 10 is such that the discharging time of condenser 9 is shorter than the charging time of condenser 1 a voltage is set up across the condenser 9 the variation of which is shown in Fig. 2c. If the condensers 9 and 1 are equal, the variation of the voltage across the condenser 9 is equal, for the duration of a pulse, to the variation of the voltage across the condenser 1 for the duration of a pulse. Upon subtracting the voltage across the condenser 9 from the voltage across the condenser 1, a voltage having the curve form shown in Fig. 2d ensues; this voltage comprises all frequency components of the signal to be reproduced. However, the fundamental frequency is materially attenuated. It is found in practice that a reduction of from three to four times the fundamental frequency is obtained. If the condensers 9 and 1 are not equal, a voltage having the desired variation can be derived from two voltages which are proportional to the condenser voltages and exhibit equal variations for the duration of the pulses.

In the circuit-arrangement shown in Fig. 3 a voltage having the curve form shown in Fig. 2d appears between a point of a potentiometer resistance 11 which shunts the series-connection of the condensers 9 and 1, and the junction of these condensers. Consequently the signal to be reproduced can be taken from these two points, after which the signal can be supplied, without the interposition of a filter, to a reproducing device, for example a loudspeaker.

In the circuit-arrangement shown in Fig. 1 the condenser 1 is discharged for the duration of a pulse and charged during the interval between the pulses. If the voltage supply 3 is inserted in the lead connecting the cathode of tube 4 to the electrode of the condenser 1 remote from the anode, the condenser 1 is charged during the pulse and discharged between the pulses through a resistance 2. In this case also the improvement aimed at by the invention is obtainable by providing the auxiliary condenser 9 and resistance 10 in the manner illustrated in Fig. 3.

The circuit-arrangement according to the invention is preferably used in a receiver for pulse modulation, more particularly pulse-phase modulation, for converting pulses obtained after detection into amplitude variations of the signal to be reproduced. From the output circuit of the device according to the invention the amplitude variations may be taken without interposition of a low-pass filter.

The device for converting phase-modulated pulses, as described, is generally suitable for converting pulses, which are short with respect to their relative distance varying with the instantaneous value of the amplitude of a signal to be reproduced, into amplitude variations corresponding with this signal. It is consequently also serviceable for converting pulses modulated in frequency by a signal to be reproduced. As has already been set out in the principal specification it is necessary in this case to connect a differentiating network in cascade with the device according to the invention. According to other modulation methods which may, for example, be a combination of the aforesaid methods, the device according to the invention must have connected in cascade with it a network adapted to each special case in order to obtain the signal to be reproduced.

What I claim is:

1. An electrical circuit arrangement for producing an output potential having amplitude variations proportional to the time interval between successive impulses of a plurality of recurring impulses applied thereto, comprising a first capacitor, a first impedance element coupled to said capacitor to produce a saw-tooth wave having a leading edge and a trailing edge, an electron discharge tube responsive to said impulses to vary the length and amplitude of one of said edges responsive to the time interval between said successive impulses, a second capacitor element and a second impedance element coupled to said discharge tube to produce a second sawtooth wave having amplitude variations in synchronism with said impulses, and means to combine said first and second saw-tooth waves in phase opposition.

2. An electrical circuit arrangement for producing an output potential having amplitude variations proportional to the time interval between successive impulses of a plurality of recurring impulses applied thereto, comprising a first capacitor, a first impedance element coupled to said capacitor to produce a saw-tooth wave having a leading edge and a trailing edge, an electron discharge tube responsive to said impulses to vary the length and amplitude of one of said edges responsive to the time interval between said successive impulses, a second capacitor element having a value substantially equal to that of said first capacitor and a second impedance element coupled to said discharge tube to produce a second saw-tooth wave having amplitude variations in synchronism with said impulses, and means to combine said first and second saw-tooth waves in phase opposition.

3. An electrical circuit arrangement for producing an output potential having amplitude variations proportional to the time interval between successive impulses of a plurality of recurring impulses applied thereto, comprising a first capacitor and a first impedance element having a given time constant, said impedance element being coupled to said capacitor to produce a saw-tooth wave having a leading edge and a trailing edge, an electron discharge tube responsive to said impulses to vary the length and amplitude of one of said edges responsive to the time interval between said successive impulses, a second capacitor element and a second impedance element having a time constant smaller than said given time constant, said second capacitor element and second impedance element being coupled to said discharge tube to produce a second saw-tooth wave having amplitude variations in synchronism with said impulses, and means to combine said first and second saw-tooth waves in phase opposition.

4. An electrical circuit arrangement for producing an output potential having amplitude variations proportional to the time interval between successive impulses of a plurality of recurring impulses applied thereto, comprising a first capacitor, a first impedance element coupled to said capacitor to produce a saw-tooth wave having a leading edge and a trailing edge, an electron discharge tube comprising a cathode, a control grid and an anode, means to connect the cathode-anode path of said discharge tube in series with said capacitor, means to apply said impulses to said control grid to vary the length and amplitude of one of said edges responsive to the time interval between said successive impulses, a second capacitor element connected in series with the cathode-anode path of said discharge tube and said first capacitor, a second impedance element coupled to said second capacitor to produce a second saw-tooth wave having amplitude variations in synchronism with said impulses, a third impedance element connected in shunt to said first and second capacitors and having an intermediate tap, and output circuit means coupled to the junction of said capacitors and to said intermediate tap.

5. An electrical circuit arrangement for producing an output potential having amplitude variations proportional to the time interval between successive impulses of a plurality of recurring impulses applied thereto, comprising a first capacitor, a first resistor coupled to said capacitor, means to apply a source of potential to said capacitor and resistor to produce a saw-tooth wave having a leading edge and a trailing edge, an electron discharge tube having a cathode, a control grid and an anode and having anode current variations substantially independent of anode voltage variations, means to connect said anode to said capacitor, means to apply said impulses to said control grid to vary the length and amplitude of one of said edges responsive to the time interval between said successive impulses, a second capacitor connected in series with said cathode and said first capacitor, a second resistor element shunting said second capacitor, third and fourth resistor elements shunting said first and second capacitors, and an output circuit coupled to the junction of said capacitors and the junction of said third and fourth resistor elements.

6. A pulse modulation receiving device comprising means to produce an output potential having amplitude variations proportional to the phase position of successive impulses of a plurality of recurring impulses applied thereto, said means comprising a first capacitor, a first impedance element coupled to said capacitor to produce a saw-tooth wave having a leading edge and a trailing edge, an electron discharge tube responsive to said impulses to vary the length and amplitude of one of said edges responsive to the time interval between said successive impulses, a second capacitor element and a second impedance element coupled to said discharge tube to produce a second saw-tooth wave having amplitude variations in synchronism with said impulses, and means to combine said first and second saw-tooth waves in phase opposition.

KLAAS POSTHUMUS.

REFERENCES CITED

The following references are of record in the file of this patent:

UNITED STATES PATENTS

| Number | Name | Date |
| --- | --- | --- |
| 2,262,407 | Rath | Nov. 11, 1941 |
| 2,274,184 | Bach | Feb. 24, 1942 |
| 2,299,252 | Pierce | Oct. 20, 1942 |
| 2,362,503 | Scott | Nov. 14, 1944 |
| 2,391,776 | Fredendall | Dec. 25, 1945 |